(12) United States Patent
Leon et al.

(10) Patent No.: US 6,730,988 B2
(45) Date of Patent: May 4, 2004

(54) METHOD OF FABRICATION TO SHARPEN CORNERS OF Y-BRANCHES IN INTEGRATED OPTICAL COMPONENTS AND OTHER MICRO-DEVICES

(75) Inventors: Francisco A. Leon, Palo Alto, CA (US); Everett X. Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/338,435

(22) Filed: Jan. 8, 2003

(65) Prior Publication Data

US 2003/0136760 A1 Jul. 24, 2003

Related U.S. Application Data

(62) Division of application No. 09/814,424, filed on Mar. 21, 2001.

(51) Int. Cl.[7] .................. H01L 29/06; C03C 25/68; G02B 6/26
(52) U.S. Cl. ................. 257/618; 216/85; 385/45
(58) Field of Search ................. 257/88, 98, 432, 257/443, 444, 528, 618, 622; 438/29, 31, 25, 26, 42, 689; 385/16, 31, 45; 216/60, 85

(56) References Cited

U.S. PATENT DOCUMENTS

| 4,039,370 | A |   | 8/1977  | Kleinknecht |
|---|---|---|---|---|
| 4,878,727 | A | * | 11/1989 | Boiarski et al. ............. 385/14 |
| 5,127,081 | A | * | 6/1992  | Koren et al. ............... 385/130 |
| 5,281,305 | A |   | 1/1994  | Lee et al. |
| 5,757,995 | A | * | 5/1998  | Chen et al. ................. 385/45 |
| 5,956,598 | A |   | 9/1999  | Huang et al. |
| 6,022,671 | A |   | 2/2000  | Binkley et al. |
| 6,054,745 | A |   | 4/2000  | Nakos et al. |
| 6,194,284 | B1 |   | 2/2001  | Chen |
| 6,194,285 | B1 |   | 2/2001  | Lin et al. |
| 6,195,478 | B1 | * | 2/2001  | Fouquet ....................... 385/17 |
| 6,229,949 | B1 |   | 5/2001  | Ido et al. |
| 6,322,634 | B1 |   | 11/2001 | Pan |
| 2001/0055440 | A1 | * | 12/2001 | Sakuma et al. ............... 385/16 |
| 2002/0136518 | A1 |   | 9/2002  | Wang et al. |

FOREIGN PATENT DOCUMENTS

| EP | 0 462 599 A2 | 12/1991 |
|---|---|---|
| JP | 02251912 | 10/1990 |
| JP | 05281699 | 10/1993 |
| JP | 07140341 | 6/1995 |
| JP | 07201804 | 8/1995 |
| JP | 09080246 | 3/1997 |
| TW | 434734 A | 5/2001 |
| WO | PCT/US02/02285 | 1/2003 |

OTHER PUBLICATIONS

Shani, Y., et al., "Buried Rib Passive Waveguide Y Junctions With Sharp Vertex on InP", *IEEE Photonics Technology Letters*, vol. 3, No. 3 (Mar. 1991) pp. 210–212.

Van Der Tol, J. J. G., et al., "Sharp Vertices in Asymmetric Y–Junctions by Double Masking", *IEEE Photonics Technology Letters*, vol. 6, No. 2 (Feb. 1994) pp. 249–251.

Yokoyama, S., et al, "Optical Waveguides on Silicon Chips", Journal of Vacuum Science & Technology, vol. 13, No. 3 (May/Jun. 1995) pp. 629–635.

\* cited by examiner

*Primary Examiner*—Jack Chen
*Assistant Examiner*—Jennifer M Dolan
(74) *Attorney, Agent, or Firm*—Blakely, Sokoloff, Taylor & Zafman LLP

(57) ABSTRACT

Substantially sharp corners for optical waveguides in integrated optical devices, photonic crystal devices, or for micro-devices, can be fabricated. Non-sharp corners such as rounded corners, are first formed using lithographic patterning and vertical etching. Next, isotropic etching is used to sharpen the rounded corners. A monitor can be used to determine if the rounded corners have been sufficiently sharpened by the isotropic etching.

12 Claims, 4 Drawing Sheets

METHOD OF FABRICATION TO SHARPEN CORNERS OF Y-BRANCHES IN INTEGRATED OPTICAL COMPONENTS AND OTHER MICRO-DEVICES

CROSS REFERENCE TO RELATED APPLICATIONS

This application is a divisional of, and claims priority from, U.S. patent application Ser. No. 09/814,424, filed Mar. 21, 2001, and currently pending.

TECHNICAL FIELD

This disclosure relates generally to circuit fabrication, and in particular but not exclusively, relates to a method of fabrication to sharpen corners used in Y-branches, such as those in integrated optical components, photonic crystal devices, and other micro-devices.

BACKGROUND

Integrated optical devices, such as those formed on a planar lightwave circuit chip, typically include optical components in the form of optical waveguides. In fact, optical waveguides are often the fundamental component of all integrated optical devices. The optical waveguides operate to direct light signals from one location to another, and often branch out or "split" at various locations to allow the light signals to propagate to several different locations. A "Y-branch" splitter configuration for an optical waveguide is a common configuration, although other configurations are also possible.

Because of the large size of a wafer having integrated optical devices (e.g., a large field size), contact lithography techniques are often used to manufacture optical waveguides. Through the use of lithographic patterning and etching, multiple optical waveguides (including their Y-branches) can be formed on a semiconductor chip.

However, contact lithography and other large-field lithography techniques produce non-optimal rounded corners or edges at the Y-branch. That is, their large exposure causes their resolution to suffer, thereby making sharp corners difficult to create. The rounded corners that result from poor resolution adversely affect efficiency and performance of the integrated optical device and the overall performance of the optical network. Specifically, the rounded corners present a large profile for light signals incident at the splitter location. This causes the incident power on the Y-branch to become non-guided or scattered, and therefore lost in the device.

In certain applications, high-resolution steppers and scanners (e.g., another type of lithography technique) are available. However, these instruments are impractical for an integrated optical device application due to their limited field size. Furthermore, optical performance considerations preclude the "stitching together" of multiple small-sized fields that have been formed using high-resolution steppers and scanners. Moreover, due to the wave-nature of light used in lithographic methods and due to the surface tension of the photoresist during the expose and development process, the resulting edges are rounded, which limits the optical performance of certain devices.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a method of fabrication to sharpen corners, such as those located at Y-branches, in integrated optical components and other micro-devices are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For simplicity and clarity of explanation, embodiments of the invention are shown in the figures using various views. It is to be appreciated that such views are merely illustrative and are not necessarily drawn to scale or to the exact shape. Furthermore, it is to be appreciated that the actual devices utilizing principles of the invention may vary in shape, size, configuration, contour, and the like, other than what is shown in the figures, due to different manufacturing processes, equipment, design tolerances, or other practical considerations that result in variations from one semiconductor device to another.

Figure 1:
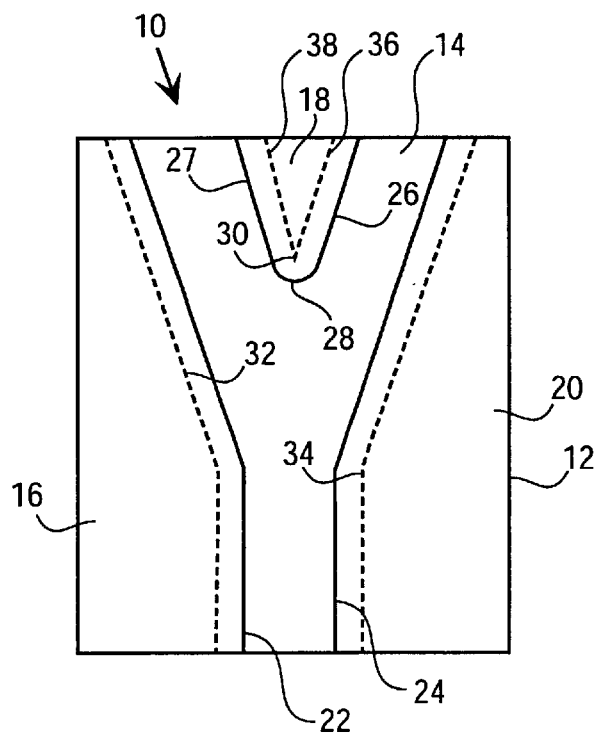
FIG. 1 is a top view of a Y-branch of an integrated optical device illustrating a comparison of a sharpened corner, according to an embodiment of the invention, to a rounded corner.

Referring first to FIG. 1, shown generally at 10 is a top view of a Y-branch that forms part of an optical waveguide for an integrated optical device. The Y-branch 10 may be formed on an integrated circuit 12 in one embodiment. The Y-branch 10 includes a region 14 where core material for the waveguide may be located, as well as regions 16, 18, and 20 where cladding material may be located.

Solid lines denote where conventional lithography techniques (e.g., patterning and etching) produce edges 22, 24, 26, and 27. In particular, a rounded corner 28 is formed at the region 18. In accordance with an embodiment of the invention, an etching technique (such as an isotropic etch) can be performed to increase the sharpness of the rounded corner 28, as shown by broken lines (e.g., edges 36 and 38) that come together to a sharp corner 30. This etching can also further widen the region 14 for the core material, as shown by broken lines that denote edges 32, 34, 36, and 38.

Figure 2:
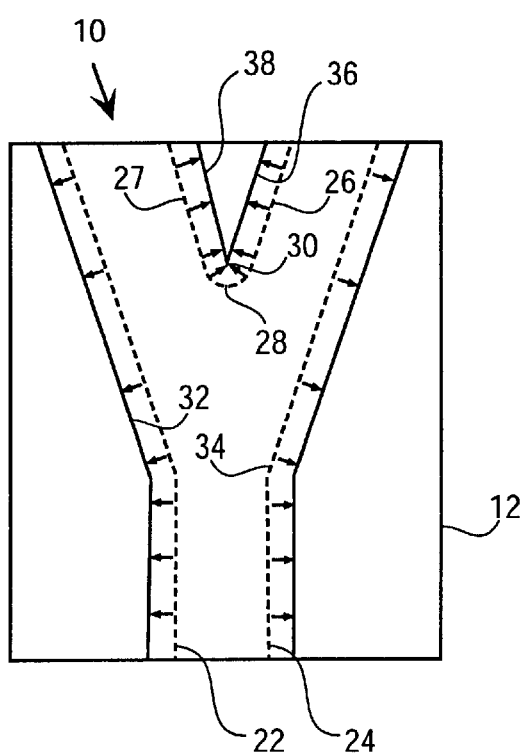
FIG. 2 is a top view of the Y-branch of FIG. 1 illustrating a sharpening of the rounded corner according to an embodiment of the invention.

FIG. 2 illustrates the sharpening of the rounded corner 28 according to an embodiment of the invention. In particular, the rounded corner 28 and the edges 26 and 27 (now shown as broken lines) are etched (shown symbolically as arrows), eventually forming the edges 36 and 38 (now shown as solid lines) that intersect to the sharp corner 30. Because an etching process (such as an isotropic etch) etches away material uniformly in all directions, the etching at the semi-circle region of the rounded corner 28 produces a substantially sharp intersection/edge at the sharp corner 30.

In accordance with an embodiment of the invention, the edges 22 and 24 (now shown as broken lines) are also etched by the same etching process to form the edges 32 and 34 (now shown as solid lines), respectively. After completion of this etching to sharpen the rounded corner 28 of the Y-branch 10, core material can be deposited into the region 14 in accordance with an embodiment that will be described later below.

Figure 3:
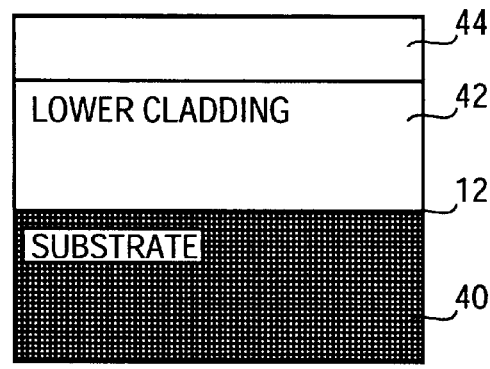
FIGS. 3–8 are cross-sectional views illustrating process flows to sharpen the rounded corner of the Y-branch and to form the integrated optical device of FIGS. 1–2.

FIGS. 3–8 are cross-sectional views illustrating process flows to sharpen the rounded corner 28 of the Y-branch 10, as well as to form the Y-branch 10 itself as a waveguide on the integrated circuit 12, in accordance with an embodiment of the invention. In FIG. 3, a substrate 40 (made of a silicon or glass material, for example) has deposited or otherwise disposed on its top surface a cladding material 42. The cladding material 42 can form the lower cladding of the waveguide, as well as a portion of the spacing between branches of the Y-branch 10 in one embodiment (e.g., the lateral cladding). A suitable material that can be used for the cladding material 42 is silicon dioxide in an embodiment. A photoresist material 44 (unpatterned) is formed over the cladding material 42.

Figure 4:
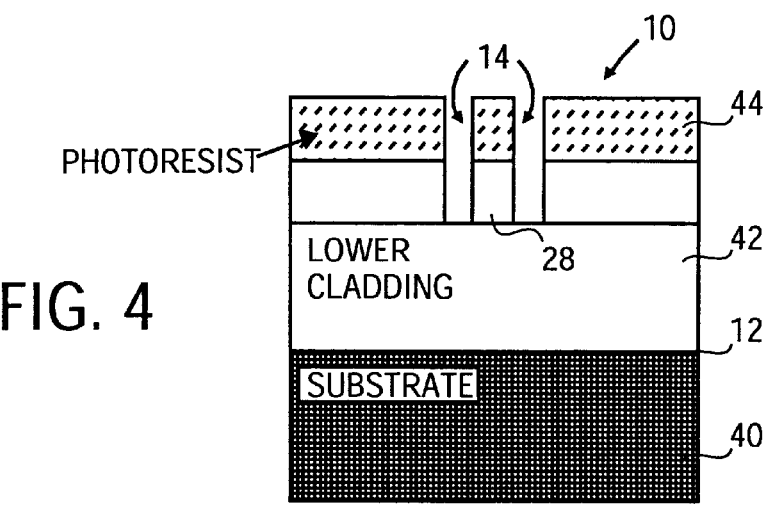

Next in FIG. 4, lithographic patterning is performed on the photoresist material 44 to define the shape of the Y-branch 10, along with vertical etching to obtain wells or trenches that define the region 14 of the Y-branch 10 where the core material is to be placed. In one embodiment, the vertical etching through the photoresist material 44 to form the trenches for the region 14 can use an anisotropic etching technique that selectively removes the cladding material 42 at the region 14.

Figure 5:
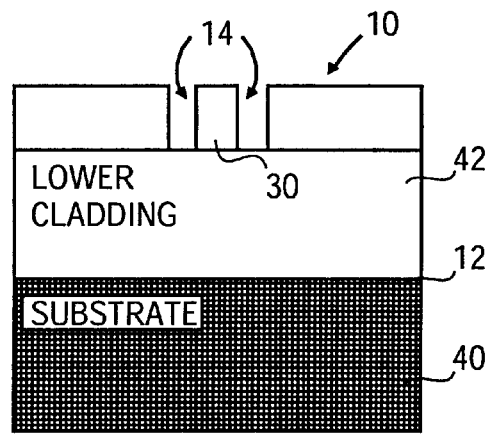

All of the photoresist material 44 can be removed next in an embodiment. In another embodiment, the photoresist material 44 can be kept in place for the next process. Whether kept in place or removed, an isotropic etch is performed next in FIG. 5 to sharpen the rounded corner 28 to obtain the sharp corner 30. In one embodiment, a conventional etching acid can be deposited in the trenches of the region 14 to sharpen the rounded corner 28 and to widen the trenches, by removing portions of the cladding material 42 adjacent to the region 14 as depicted in FIG. 5.

Figure 6:
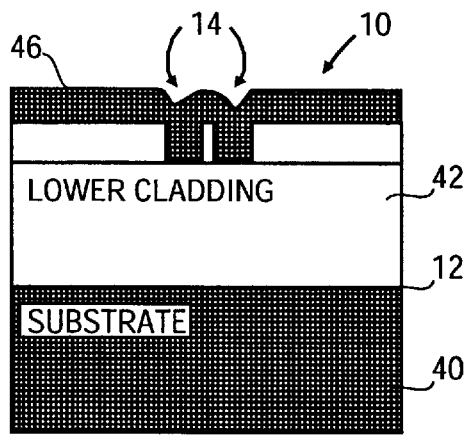
Figure 7:
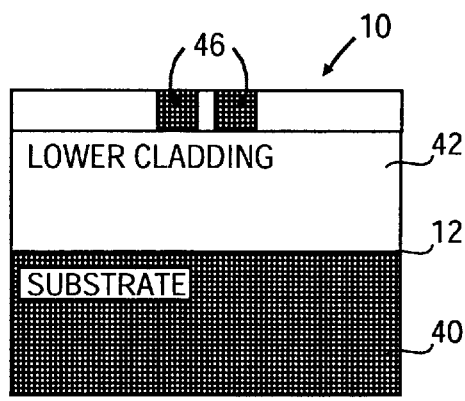

A core material 46 is then deposited in the trenches of the region 14 in FIG. 6. Thin film deposition techniques and/or re-flow techniques can be used in one embodiment to fill the trenches of the region 14 with the core material 46. Examples of suitable core material include, but are not limited to, germanium-doped silicon dioxide, silicon nitride, silicon, or indium-phosphate material. At least some of the core material 46 may be deposited over non-core regions during the deposition process of FIG. 6. A chemical-mechanical polishing may be performed in FIG. 7 to remove the excess core material 46 except at the core regions 14.

Figure 8:
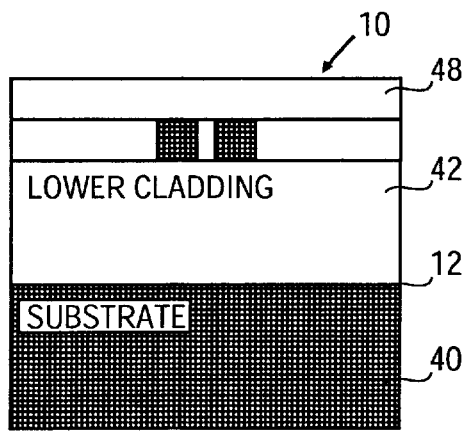

In FIG. 8, an upper or final cladding material 48 is deposited or reflowed over the core material 46, over the spacing 30, and over the rest of the cladding material 42. Thin film deposition techniques can be used in one embodiment to deposit the upper cladding material 48. The upper cladding material 48 can include, but not be limited to, silicon dioxide, phosphorous-doped silicon oxide, or other suitable cladding material.

Accordingly as shown in FIGS. 3–8, sharp corners can be created in one embodiment by using an isotropic etch process after a lithography process. This produces a corner that is sharper than those that can be defined by conventional lithography. For example, a round corner may have a thickness/diameter of approximately one micron, while an embodiment of the invention can produce a sharp corner that approaches approximately 0.1 micron.

Figure 9:
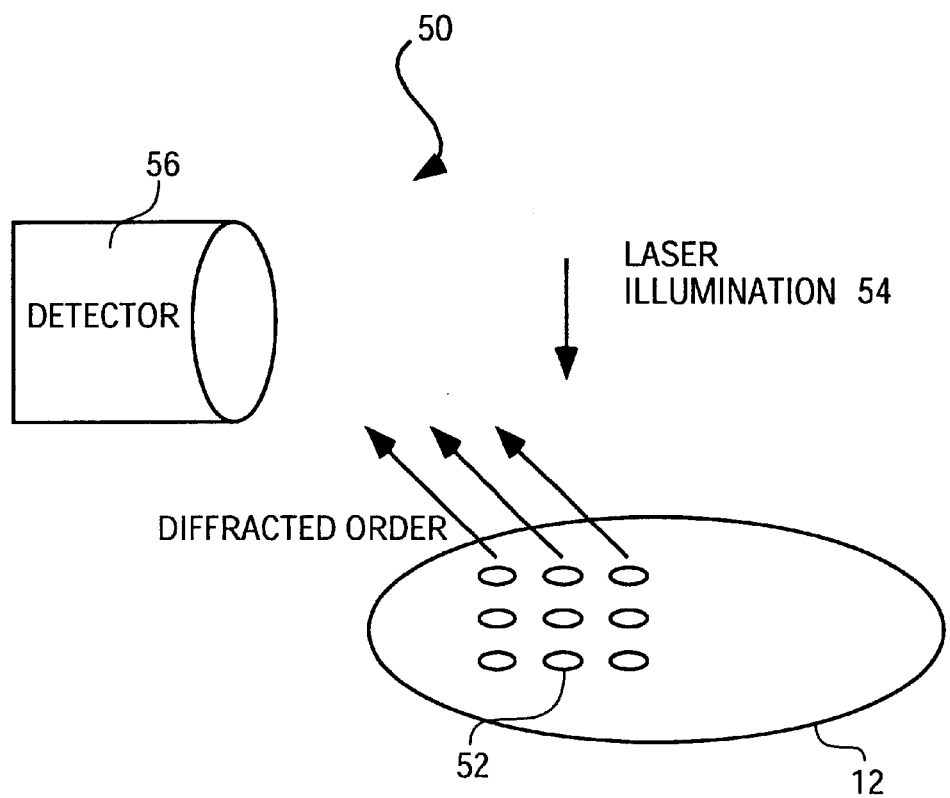
FIG. 9 is a schematic diagram of an embodiment of an apparatus and method to monitor etching that sharpens the corner of the Y-branch of FIGS. 1–8.

One embodiment of the invention provides a wafer monitor apparatus and method to provide information as to when to stop the etching of FIG. 5 to obtain the sharp corner 30. Such an apparatus and method is helpful, for instance, so that the etching is not stopped prematurely (resulting in under-etching that produces a non-sharp corner) or so that the etching is not stopped too late (resulting in over-etching that removes too much material). An embodiment of such an apparatus and method is shown as a monitor 50 in FIG. 9.

One embodiment of the monitor 50 can be an "in-situ" etch monitor, such that minimum feature size pillars 52 are on the same chip or integrated circuit 12 as the Y-branch 10. The pillars 52 can be formed during the same lithographic patterning and vertical etch processes shown in FIGS. 3 and 4. That is, the pillars 52 are formed concurrently with the rounded corner 28 using patterning and vertical etching, and are made of the same material (e.g., the same material as the lower cladding material 42). In an embodiment, the pillars 52 are semi-circular or circular in shape, and each pillar has substantially the same radius or dimension as the rounded corner 28.

In an embodiment, the pillars 52 can be formed in a group such that a diffraction grating results if the pillars are illuminated by a laser light or other light source at 54. A suitable detector 56, such as an avalanche photodiode, PIN photodetector, or other photosensitive device can be used to detect the light diffracted by the pillars 52. In operation according to an embodiment, the pillars 52 are etched during the same etching process used to sharpen the rounded corner 28, while being illuminated by the light source at 52. Since the pillars 52 each have a radius that is substantially the same as the radius of the rounded corner 28, the amount of time used to eliminate (e.g., etch away) the pillars 52 is equal to the amount of time to sharpen the rounded corner 28 into the sharp corner 30. Elimination of the pillars 52 during the etching process results in a detection (by the detector 56) of one of the diffraction orders or detection of some type of change in the light diffracted from the pillars 52. From this detected information, elimination of the pillars 52 (and hence the completion of sharpening of the rounded corner 28 into the sharp corner 30) can be determined.

In conclusion, an embodiment of the invention can provide an improved Y-branch splitter having a corner that is sharper, regardless of the lithography resolution. A Y-branch splitter having a sharp corner can provide higher efficiency, resulting in an overall improvement in performance of the integrated optical device.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while an embodiment of the invention has been described herein as producing a sharp corner for a Y-branch of an integrated optical device, it is to be appreciated that embodiments of the invention can be implemented for other components of an integrated optical device that do not necessarily have "Y" configurations. Furthermore, embodiments of the invention may involve devices other than integrated optical devices. Various micro-devices or micro-structures, such as microelectromechanical structures (MEMS) and photonic bandgap material, can be fabricated to have sharper corners based on the embodiments of methods described herein. Indeed, an embodiment of the invention can be used for any type of micro-device that would benefit from having a sharper corner or a sharper edge. The corner may be surrounded by a region having a different material, such as in the Y-branch 10 for a waveguide shown in FIGS. 3–8, or the different material can be air, as with some MEMS devices that may utilize the corner as a pivot point or cantilever.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a substrate;
   a first material layer formed over the substrate;
   a trench defined in the first material layer, the trench having a corner with a first radius; and
   a plurality of pillars defined in the first material layer to form a diffraction grating, the plurality of pillars having a second radius substantially equal to the first radius, the plurality of pillars adapted to be etched via an etching process of the corner and the plurality of pillars, the plurality of pillars defined to diffract light during the etching process of the corner and the plurality of pillars.

2. The apparatus of claim 1 wherein the trench is defined to form a waveguide.

3. The apparatus of claim 2 wherein the trench has a Y-branch shape and wherein the corner forms a splitting point of the Y-branch shape.

4. The apparatus of claim 3 wherein the first material layer comprises a cladding material of the waveguide.

5. The apparatus of claim 1 further comprising a plurality of trenches defined in the first material layer having a corresponding plurality of corners with corresponding first plurality of radii.

6. The apparatus of claim 5 wherein the plurality of trenches having the corresponding plurality of corners are defined to form a plurality of Y-branch waveguides within the first material layer.

7. The apparatus of claim 6 wherein the substrate comprises integrated circuit substrate.

8. The apparatus of claim 1 wherein the trench having the corner is defined in the first material layer to form a microelectromechanical structure ("MEMS").

9. The apparatus of claim 1 wherein each of the plurality of pillars comprises a semi-circular pillar.

10. The apparatus of claim 1 wherein each of the plurality of pillars comprises a circular pillar.

11. The apparatus of claim 1 wherein the plurality of pillars are adapted to act as a timer for the etching process of the corner.

12. The apparatus of claim 11 wherein the plurality of pillars are adapted to act as the timer for an isotropic etching process of the corner.

* * * * *